Nov. 5, 1940.   M. H. GROVE   2,220,229
PRESSURE REGULATOR
Filed Oct. 9, 1937   2 Sheets-Sheet 2
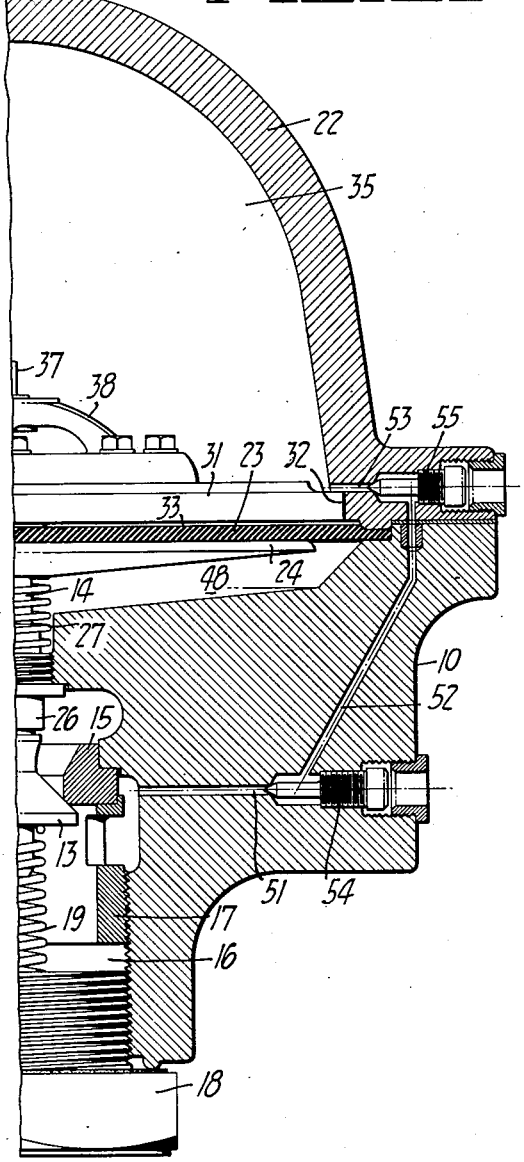
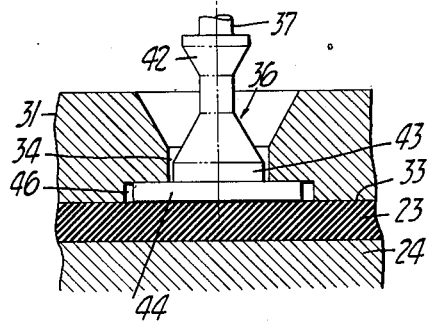
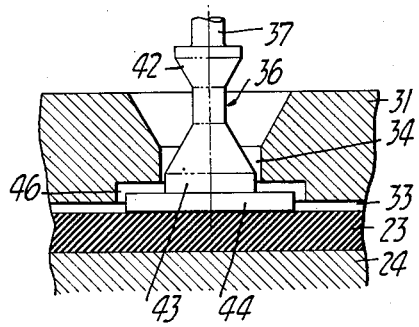
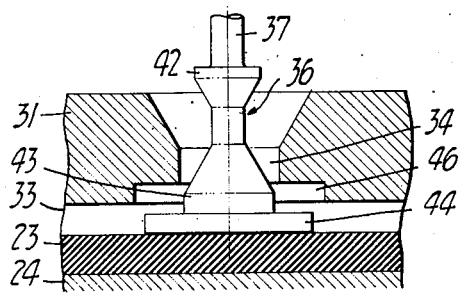
INVENTOR.
Marvin H. Grove
BY
ATTORNEY.

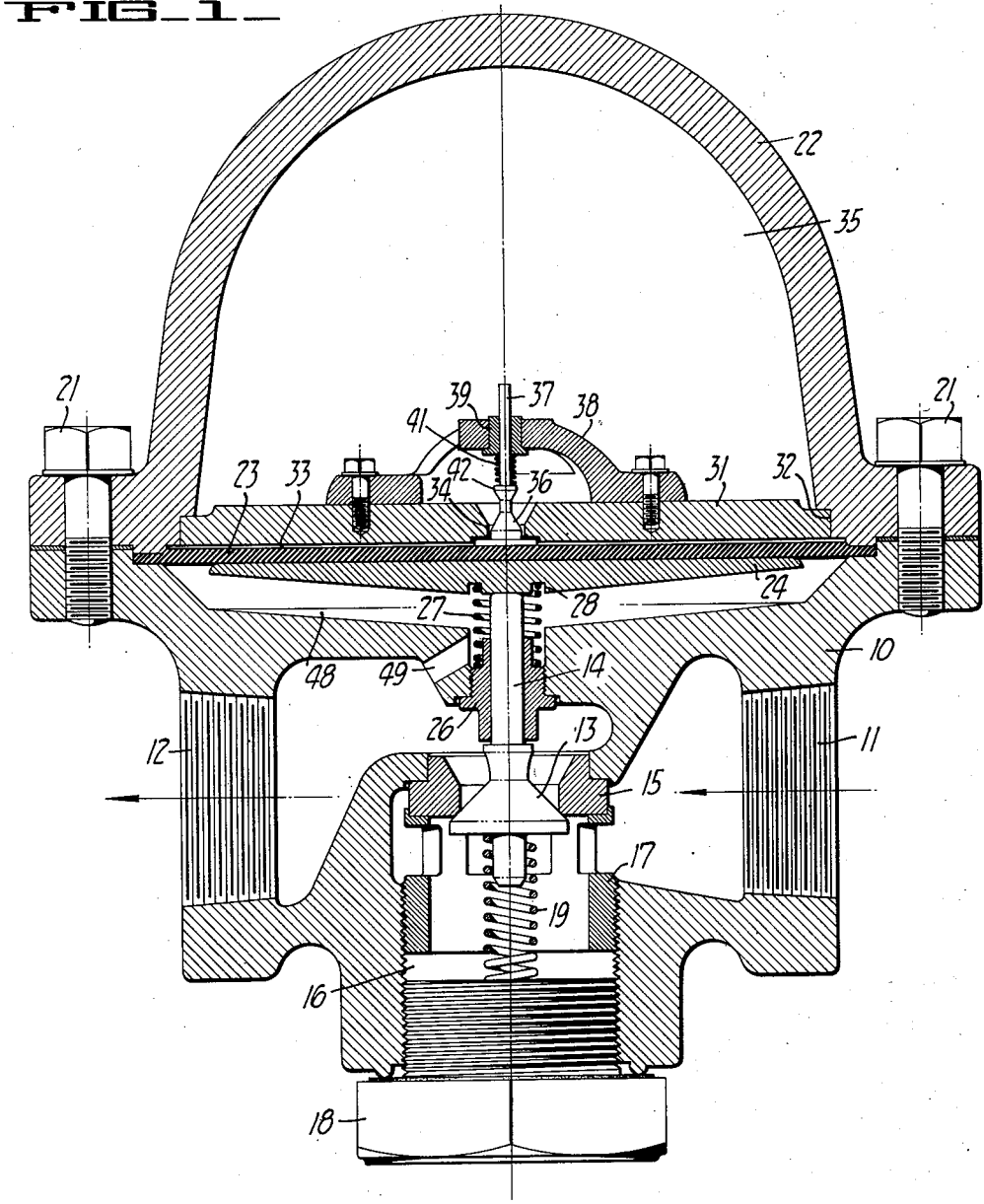

Patented Nov. 5, 1940

2,220,229

UNITED STATES PATENT OFFICE 2,220,229

PRESSURE REGULATOR

Marvin H. Grove, Berkeley, Calif.

Application October 9, 1937, Serial No. 168,218

3 Claims. (Cl. 50—21)

This invention relates generally to devices for automatically regulating flow of various fluids. In a typical example the invention is incorporated in a pressure regulator serving to supply fluid at a substantially constant pressure to a point of demand, from a relatively higher pressure source of fluid supply.

In my Patent No. 2,047,101, I have disclosed a pressure regulator making use of a novel type of restraint to prevent fluttering or chattering of the valve member upon its seat, and which is applicable to high pressure service. More particularly the regulator disclosed in said patent makes use of a gas pressure loading dome and a baffle wall extending in close proximity with one side of the operating diaphragm. A confined fluid space is thus formed, which is vented through a controlling orifice, whereby a pneumatic restraint is provided which is primarily effective against undesired movement of the diaphragm when the valve member is in proximity of its seat. Such regulators have met with commercial success and have supplied a long felt need, particularly in fields where the handling of high pressures is involved and where a wide latitude of adjustment is desired.

A small fixed controling orifice as described above has the advantage of utmost simplictiy and freedom from mechanical defects. However, in certain types of service it may be subject to certain disadvantages, as for example it may not close or open as rapidly as desired with a relatively low differential between the inlet and outlet pressures. In the present invention I have provided a means which takes the place of a fixed controlling orifice, and which for positions of the diaphragm corresponding to intermediate or full open positions of the valve member, will result in free venting of the space between the baffle wall and the diaphragm. In attaining this result I made use of a special controlling valve, which controls the effective area of the venting opening, whereby for positions of the diaphragm corresponding to intermediate or full open positions of the main valve member, the opening has a relatively large effective area. As a result the regulator described herein is characterized by a somewhat higher degree of sensitivity under certain operating conditions, than the regulator of said Patent No. 2,047,101, even though for many types of service it is not contemplated that it will displace the use of a simple fixed venting orifice. Also it will shut off and open rapidly even though there may not be a great difference between the inflow and outlet pressures.

Further objects and features of the invention will appear from the following description in which the preferred embodiment of the invention has been set forth in detail in conjunction with the accompanying drawings.

Referring to the drawings:

Fig. 1 is a side elevational view, in cross section, illustrating a regulator of the pressure dome loaded type, incorporating the present invention.

Fig. 2 is a cross sectional detail, showing one-half of the regulator, and taken on a plane at right angles to the cross sectional plane of Fig. 1.

Fig. 3 is an enlarged detail view illustrating the functioning of the control valve.

Figs. 4 and 5 are views similar to Fig. 3, but showing other operating positions for the control valve.

The regulator as disclosed herein consists of a body 10, having fluid inflow and outflow openings 11 and 12 respectively. Disposed within the body 10 there is a main valve member 13, carried by the valve stem 14. This valve member cooperates with a suitable seat ring 15, which is mounted within the body, and through which fluid flows when the valve member is opened. For convenience in permitting removal and replacement of parts, the body below the seat ring 15 is provided with a threaded opening 16. A ported sleeve 17 is threaded within the opening 16, and has its upper end engaging the seat ring 15, to retain the seat ring in place. The opening 16 is normally sealed by the closure plug 18. A relatively light spring 19 is shown having its upper end seated upon the lower end of valve member 13, while the lower end of the spring is carried by closure plug 18.

Clamped upon the body 10, as by means of screws or bolts 21, there is a gas pressure loading dome 22. A flexible diaphragm 23 made of suitable material, such as vulcanized rubber or "Duprene," has its peripheral edge portion clamped between opposed annular shoulders, formed on the body 10 and the lower face of the dome 22. The lower side of the diaphragm 23 is shown being engaged by a relatively rigid thrust disc 24, which in turn is engaged with the upper end of valve stem 14. The valve stem 14 is shown being guided by the bushing 26. A relatively light compression spring 27 has its lower end seated upon bushing 26, and its upper end seated within an annular groove 28 formed in the lower face of disc 24. Spring 27 serves to urge disc 24 into engagement with the lower face of the diaphragm 23, and also serves to generally align the disc 24 and to prevent lateral displacement of the same, without however causing detrimental side thrust to be impressed upon the stem 14.

Extending across the upper side of diaphragm 23, there is a relatively rigid baffle wall 31. This wall is circular in contour, in accordance with the shaping of the dome and the diaphragm, and in mounting the same with respect to the dome, its peripheral edge portion can have a pressed fit within the machined recess 32. The positioning of the baffle wall 31 with respect to the diaphragm is such that a relatively small clearance or space 33 is provided between the lower face of the baffle wall and the upper face of the diaphragm 23, when the diaphragm is in a position such as illustrated in Fig. 1 corresponding to closed position of the main valve 13. For example in a regulator intended for use with relatively high pressure, the clearance 33 can be in the neighborhood of $\frac{1}{32}$ of an inch for a total travel of the daphragm of about ⅜ of an inch. Formed within the baffle wall 31 there is a venting opening 34, through which communication is established between the space 33 and the remainder of the gas chamber 35, formed by the dome 22.

In order to control venting of gas through opening 34, a control valve member 36 is provided, which can be formed as illustrated in Fig. 1, and particularly in Figs. 3 to 5 inclusive. Thus the valve member in this instance is carried by a stem 37, extending substantially perpendicular to the general plane of the diaphragm. In order to slidably retain this stem 37, a suitable bracket 38 is shown secured to the baffle wall 31, and this bracket is provided with a bushing 39 through which the stem extends. A relatively light compression spring 41 has its upper end engaging the bushing 39, and has its lower end engaging a collar 42, formed on the stem 37. Thus the stem is always urged downwardly towards the diaphragm. The valve member 36 is provided with a cylindrically shaped portion 43, which is only slightly smaller in diameter than the cylindrical opening 34, in the baffle wall. In order to limit upward movement of the valve member, beyond the position illustrated in Fig. 3, a relatively rigid disc 44 is secured to its lower end, and this disc can be accommodated in the annular recess 46, provided in the lower face of the baffle wall. The lower face of the disc 44 normally engages the upper face of the diaphragm 23.

It may be explained at this point that with the parts positioned as illustrated in Fig. 3, flow of gas to or from the space 33, by virtue of movement of the diaphragm, will be greatly impeded, because of the relatively small effective cross-sectional area afforded by the clearance between the cylindrical portions 43 of the valve member and the opening 34 in the baffle wall. Fig. 3 illustrates a position of the diaphragm in which it is pressed upwardly against the lower side of the baffle wall, whereby the clearance between the upper face of the diaphragm and the lower face of the baffle wall is negligible. Such movement of the diaphragm is permitted, because the diaphragm has only abutting engagement with the valve stem 14. Fig. 4 illustrates the position of the diaphragm 23 illustrated in Fig. 1, corresponding to closed position of the main valve member 13. In this position the clearance 33 is of the order previously mentioned, and it will be noted that the cylindrical portion 43 of the valve member 36 is still within the opening 34, and therefore impedance is offered to flow of gas to or from the clearance 33. Fig. 5 represents the position of the parts for intermediate or open positions of the main valve member. In this case the cylindrical portion 43 of the control valve member is below the confines of the opening 34, and therefore substantially no impedance is offered to flow of gas to or from the space between the baffle wall and the diaphragm.

Since the device as described above is intended primarily for regulation of gas pressures, to afford a substantially constant pressure of gas to a point of demand, the chamber 48 below the diaphragm, is in communication with the outflow side of the regulator through the opening 49. The chamber 35 within the dome 22, receives a predetermined amount of gas under pressure, and it is the pressure of this gas which in this instance affords the loading for the regulator, or in other words determines the pressure at which gas is supplied to the outlet side. The loading can be varied to the value desired, by an arrangement of needle valves, such as shown in Fig. 2. In this instance ducts 51, 52 and 53 serially communicate with the inflow side of the regulator. Needle valve 54 controls communication between ducts 51 and 52, and needle valve 55 controls communication between ducts 52 and 53. When both needle valves 54 and 55 are opened gas from the inflow side of the regulator can be permitted to flow into the dome 22, to raise the pressure within this dome, and thus raise the pressure upon the outflow side of the regulator, to the value desired. By opening needle valve 55, while needle valve 54 is closed, and while permitting some gas leakage past the threads of valve 55, the pressure within the dome can be lowered to a value desired.

Operation of the regulator described above can now be reviewed as follows: The flexing movements of the diaphragm 23 during operation of the regulator, are followed by movements of the control valve member 36. Abrupt movements of the diaphragm such as occur in many regulators when the valve member chatters or slaps against its seat, or when the valve member pops open from closed position from its seat, are prevented by virtue of the restraint afforded by baffle wall 31. The restraint is a pneumatic one, by virtue of the large variations in the volume of space 33, occasioned by relatively small movements of the diaphragm when the diaphragm is adjacent the baffle. It will be evident that for movements of the diaphragm when the main valve member is in the proximity of its seat, the opening 34 is restricted by the control valve member 36, because these parts then occupy the general position illustrated in Fig. 4. After the main valve member has been moved to intermediate or full open positions, virtually no restraint whatever is placed upon the diaphragm, by virtue of the free communication provided between space 33 and the remainder of the gas chamber 35, through the opening 34. Therefore the diaphragm can rapidly respond to variations in the outflow pressure, to a high degree of accuracy, and may hunt at a relatively rapid rate, without however permitting the valve member to slap or chatter upon the seat, and without causing visible changes in the recorded outflow pressure. It will also be evident that because the opening 34 is relatively large in dimensions, it is virtually impossible for this opening to become clogged by corrosion or foreign matter. If any foreign matter should find its way into opening 34, it would cause no material interference with proper operation, because the opening 34 would be kept unobstructed by movements of the valve member 36.

As an example of a regulator which I have constructed, and which has given good results, the diaphragm 23 had an effective diameter of about 7¼ inches. The main valve had a travel of about ⅜ inch, and the opening through seat ring 15 was about ¾ inch. The clearance between the lower face of plate 31 and the upper face of the diaphragm, corresponding to closed position as shown in Fig. 1, was about 1/32 of an inch. Opening 34 was 0.312 inch in diameter (circular) with an area of .00196 square inch. Portion 43 of valve 36 was .308 inch in diameter, with an area of .00173 square inch. This regulator gave accurate regulation with no visible pressure variations on the outflow side (using standard Bourdon tube type gauge) with inflow pressures varying over a range from about 25 to 2800 lbs. per square inch, and outflow pressures over an adjusted range from about 1 to 2800 lbs. per square inch. Even with a relatively low differential between the inlet and outlet, such as an inlet pressure of 25 lbs. per square inch, and an outlet pressure of 20 lbs. per square inch, there was no fluttering, the regulation was accurate, and there was rapid closing and opening upon making a quick shut off or opening of the outflow side.

I claim:

1. In a fluid flow control device of the type in which a flexible fluid pressure operated diaphragm causes movement of a valve member in opposite directions between open and closed positions, thereby controlling flow of fluid through a valve body, means forming a gas chamber on one side of the diaphragm, the chamber being adapted to receive gas under pressure to urge the diaphragm in a direction to open the valve member, such pressure forming substantially the entire loading force upon the diaphragm, a rigid baffle wall extending across said one side of the diaphragm in close proximity with the same, there being a small clearance between the diaphragm and the baffle wall which is substantially less than the travel of the diaphragm in moving the valve member between closed and full open positions, an opening in the baffle wall which of itself is of such cross sectional area as to offer no resistance to flow of gas between said clearance and the remainder of said chamber and a member positioned within said opening and movable with the diaphragm, said member being so dimensioned as to form between its periphery and the adjacent surface of the baffle wall a restricted orifice whereby flow of gas through said opening is restricted to restrain abrupt movements of the diaphragm from the position of the same corresponding to closed position of the valve member, whereby chattering or fluttering of the valve member is prevented.

2. In a fluid flow control device of the type in which a flexible fluid operated diaphragm causes movement of a valve member in opposite directions between open and closed positions, the valve member in turn serving to control flow of fluid through a body, means forming a gas chamber on one side of the diaphragm, the chamber being adapted to receive gas under pressure to form substantially the entire loading force upon the diaphragm and serving to urge the diaphragm in a direction to open the valve member, a rigid baffle wall extending across said one side of the diaphragm in close proximity with the diaphragm, there being a small clearance between the diaphragm and the baffle wall which is substantially less than the travel of the diaphragm in moving the valve member between closed and full open positions, an opening in the baffle wall which of itself is of such cross sectional area as to offer no resistance to flow of gas between said clearance and the remainder of the gas chamber, and a control valve disposed within said opening and movable with the diaphragm, said control member being of such a diameter as to materially restrict flow of gas about said member and through said opening for movements of the diaphragm from the position of the same corresponding to closed position of the valve member, whereby chattering or fluttering of the valve member is prevented, said valve member offering substantially less resistance to flow of gas between said clearance and the remainder of the gas chamber for positions of the diaphragm corresponding generally to full open position of the valve member.

3. In a fluid flow control device of the type in which a flexible fluid operated diaphragm causes movement of a valve member in opposite directions between open and closed positions, the valve member in turn serving to control flow of fluid through a body, a rigid baffle wall extending across one side of the diaphragm in close proximity with the diaphragm, there being a small clearance between the diaphragm and the baffle wall which is substantially less than the travel of the diaphragm in moving the valve member between closed and full open positions, an opening in the baffle wall which of itself is of such cross sectional area as to offer substantially no resistance to flow of gas through said opening, and a control valve disposed within said opening and movable with the diaphragm, the said control valve and opening having a relatively slight clearance when the said valve member is in closed position whereby to materially restrict flow of gas through said opening to restrain abrupt movements of the diaphragm from the position of the same corresponding to closed position of the valve member, and the said control valve and opening having a relatively great clearance when the said valve member is in intermediate or full open position whereby to offer relatively less restriction to the flow of gas through said opening, the said control valve and opening thus regulating flexing of the diaphragm to cause rapid opening and closing of said valve member without chattering or fluttering.

MARVIN H. GROVE.